No. 12,076. REISSUED JAN. 27, 1903.
W. J. WALSH.
ADJUSTABLE SWIVEL SWING BOOK HOLDER BRACKET.
APPLICATION FILED JULY 1, 1901.
Fig. 1,
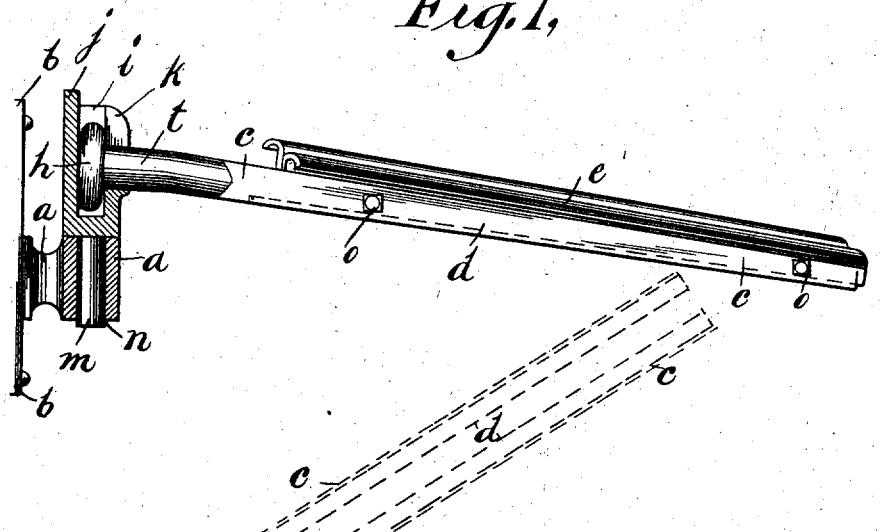
Fig. 2,
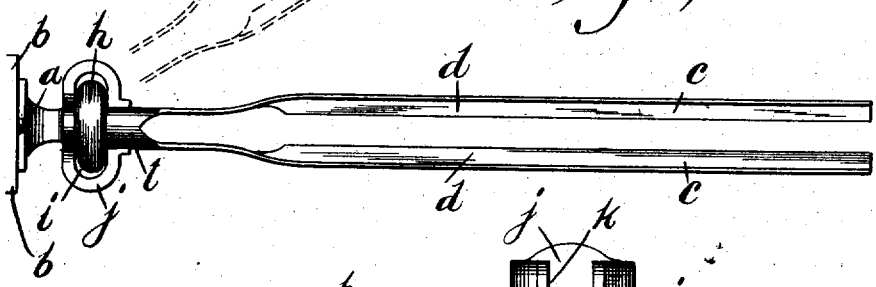
Fig. 3,
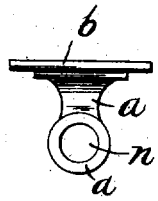
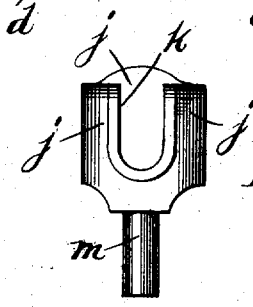
Fig. 4,
WITNESSES:
Harry Goss.
Fred. E. Crouse.
INVENTOR
William James Walsh
BY
Dickerson, Brown & Raegener
HIS ATTORNEYS
THE NORRIS PETERS CO., PHOTO-LITHO., WASHINGTON, D. C.

UNITED STATES PATENT OFFICE.

WILLIAM JAMES WALSH, OF HAMILTON, CANADA, ASSIGNOR, BY MESNE ASSIGNMENTS, TO THE ADJUSTABLE BOOK BRACKET COMPANY, OF NEW YORK, N. Y., A CORPORATION OF NEW YORK.

ADJUSTABLE SWIVEL SWING BOOK-HOLDER BRACKET.

SPECIFICATION forming part of Reissued Letters Patent No. 12,076, dated January 27, 1903.

Original No. 669,935, dated March 12, 1901. Application for reissue filed July 1, 1901. Serial No. 66,797.

*To all whom it may concern:*

Be it known that I, WILLIAM JAMES WALSH, a citizen of Canada, residing at Hamilton, in the county in Wentworth, in the Province of Ontario, Canada, have invented new and useful Improvements in Adjustable Swivel Swing Book-Holder Brackets, of which the following is a specification.

My invention relates to a projecting wall-bracket arranged and devised to receive and hold the secured back or bound part of a book, said bracket, with the book, being capable of adjustment to various positions for reading and to a closed position when not in use.

The objects of my invention are, first, to provide a book-holder which shall be of suitable incline for reading; second, to provide a book-holder which shall be capable of swivel and swing adjustment; third, to afford facilities for the placing of the same to a position parallel with the wall or other place to which the bracket may be fastened, and, fourth, to the support of the back and those edges of the sides of the binding adjacent to the back of the book.

To these ends the invention consists of features of construction and combinations of devices hereinafter described, and illustrated in the accompanying drawings, forming part hereof, in which—

Figure 1 is a side elevation, partly in section, of the book-bracket with the outline of a book, the back or bound part of the book being secured therein. Fig. 2 is a plan of the same. Fig. 3 is a detail plan of the bracket-bearing, and Fig. 4 is a detail front elevation of the swivel part of the bracket.

Similar letters refer to similar parts throughout the several views.

In the drawings the bearing or standard part of the bracket is indicated by *a* and has a suitable flange *b* for fastening the same to a wall or other convenient and suitable place.

The reference *c* designates the book-supporting arms of the bracket of suitable incline for reading. Each has an inner base-flange *d* for the back of the book *e* to rest on, the parts *c d* forming angle irons or bars. The wall ends of the arms *c* are brought together and intersect to form a fork having a round shank *f* with circular button-headed end *h*, which is adapted to fit easily into the socket *i* of the arm-bearing *j* to retain said arms in position. This bearing *j* has a front opening *k* for the shank *f* of the arms *c*. The said socket *i* and front opening *k* both open out on the top of the bearing *j* to allow entrance of the shank *f*, with its head. In order to allow a swivel side adjustment or movement of the book-supporting arms, as seen in broken lines in Fig. 2 of the drawings, the arm-bearing *j* has a lower round shank *m*, which fits into the round socket *n* of the upright bearing *a*. This vertical socket *n* allows freedom to the arms *c* to swing the same to a suitable degree for the proper reading of the book.

The book *e* is shown slightly in perspective and is secured to the inclined arms *c* by means of suitable bolts *o* or laces through said arms or by other approved method. It will be observed that on account of the circular construction of the head *h* the arms, with the book, may be slightly revolved or inclined to either side to suit the reader and remain in position and also may be turned completely over and allow the leaves to hang downward, this latter keeping the book dust-proof and clean. It will also be noticed that the arms, with the book, may be swung to a position parallel with the wall or whatever the bracket may be attached to.

This book-holding device is adapted for catalogues, telephone-index books, music-books, and other books.

It will be noticed that the flanges *d* of the arms *c* terminate a distance from the shank *f* to facilitate the widening apart or the contracting of the arms to suit varying thickness of books and also that the arms, with the book, may be easily removed from the socket *i* for reading or other purposes. This book-holding device is conducive to the preservation of the corners of the leaves of the book.

What I claim as my invention, and desire to secure by reissued Letters Patent, is—

1. In a book-holder, arms, inner flanges as a base to said arms to support the back of a book, a round shank formed at the inner and intersecting ends of said arms, a round head at the end of said shank, a bracket, a bearing having a swivel connection with said bracket, and provided with a socket and said round head being capable of revolving in the socket in said bracket, substantially as described.

2. In a book-holder of the character described, arms to receive the back of a book, base-flanges between said arms to support the book, means to secure the book between said arms, a round shank formed at the inner and intersecting ends of said arms, a round head at the end of said shank, a bracket, and a bearing capable of swivel movement in said bracket and having a socket to admit and hold said shank and head and to allow said arms to revolve, substantially as described.

3. A book-holder comprising arms, base-flanges on the inner side of the arms to support a book between the arms and on the flanges, a round shank formed at the intersecting end of the arms, a round head at the end of the shank, a bearing with socket for said head to allow the book-holder to revolve, a lower shank on the bearing, and a bracket for said bearing to allow swivel movement to the book-supporting arms, substantially as described.

4. In a book-holder, the combination of a bracket or standard, a bearing supported by said bracket and having an open-ended slot in one side thereof, a horizontally-disposed book-supporting arm provided with a shank passing freely through and turning in said slot, and a button on the end of said shank for engaging with the front and rear walls of the bearing, whereby said arm may rotate about its longitudinal axis to and be held in any desired position, substantially as described.

5. In a book-holder, the combination of a bracket or standard provided with an upright socket, a bearing having a shank for and turning in said socket and provided with an open-topped slot in one side thereof, and a horizontally-disposed book-supporting arm having a shank passing through and turning freely in said slot, and a button on the end of said shank for engaging with the front and back walls of the socket, whereby the arm may be swung horizontally and may also be rotated about its longitudinal axis to and held by said button and socket in any desired position, substantially as described.

6. In a book-holder, the combination of a bracket provided with an upright socket, an upright bearing rotatably mounted in said socket, said bearing being of an oblong shape and provided with an open-topped slot in one of its longer sides, and a horizontally-disposed book-supporting arm having a shank passing through and turning freely in said slot, and a button on the end of the shank for engaging with the front and back walls of the bearing, substantially as described.

7. A book-holder comprising two angle-bars for receiving, clamping, and supporting the back of a book, a fork uniting said bars, and means for drawing said bars toward each other to clamp and retain the book in place between said bars, substantially as described.

8. In a book-holder, the combination of two horizontally-disposed angle-bars for receiving, clamping, and supporting the back of a book, a fork uniting said bars, means for drawing said bars toward each other to clamp and retain the book in place between said bars, a bearing, and a swiveling connection between said bearing and the end of the fork, whereby fork and bars may be rotated about their longitudinal axis, substantially as described.

9. In a book-holder, the combination of two horizontally-disposed angle-bars for receiving, clamping, and supporting the back of a book, a fork uniting said bars, means for drawing said bars toward each other to clamp and retain the book between them, a bearing pivoted on a vertical axis, and a swiveling connection between said bearing and the end of the fork, substantially as described.

In witness whereof I have signed my name to this specification in the presence of two subscribing witnesses.

WILLIAM JAMES WALSH.

Witnesses:

THOMAS LAWLOR,

J. A. CALHAM.